INVENTOR.
ALEXANDER ROVELL
BY A. M. Fernandez
ATTORNEY

INVENTOR.
ALEXANDER ROVELL
BY A. M. Fernandez
ATTORNEY

March 8, 1966 A. ROVELL 3,239,694
BI-LEVEL THRESHOLD SETTING CIRCUIT
Filed Sept. 25, 1963 3 Sheets-Sheet 3

INVENTOR.
ALEXANDER ROVELL
BY A. M. Fernandez
ATTORNEY

United States Patent Office 3,239,694
Patented Mar. 8, 1966

3,239,694

BI-LEVEL THRESHOLD SETTING CIRCUIT

Alexander Rovell, Pico Rivera, Calif., assignor to North American Aviation, Inc.

Filed Sept. 25, 1963, Ser. No. 311,462
14 Claims. (Cl. 307—88.5)

This invention relates to a voltage level detector or threshold setting circuit, and more particularly to a threshold setting circuit which is alternately set to independent threshold levels in response to the signal being compared as it passes through the threshold levels in alternating directions.

A threshold setting circuit is often required in electronic systems, usually so that only that part of a signal above a certain noise level is transmitted to a load. An example is the read channel of a magnetic drum or disc memory of a data processing system, particularly if non-return-to-zero (NRZ) recording has been employed.

Noise threshold setting is particularly necessary in the playback or read channel of an NRZ recorded memory system because a pulse occurs only when there is a change in value of successively recorded binary digits, i.e., only when a binary digit 1 or 0 is followed by a binary digit 0 or 1, respectively. At other times there is no read signal; but there may be noise present which, in the absence of some threshold setting circuit, may be interpreted as a change in value of successively recorded binary digits. If such a mistake is made, all subsequent binary digits read in a group or word are incorrect.

The threshold setting necessary with NRZ recording should be bi-level or bipolar because the polarity of the signal read reverses each time there is a change in the value of successively recorded binary digits. Bipolar threshold circuits have been devised in the past; however, such circuits have not always been satisfactory. For instance, they have not been adjustable such that the threshold level of each polarity may be set independently.

Another shortcoming of the prior art circuits is that the output signal is present only when the input signal is above the threshold level, which imposes narrow limitations on strobe timing in the reading channel. In an NRZ recording system, such a limitation may be readily alleviated if a threshold setting circuit is provided which is set to a second threshold level when the input signal passes through a first threshold level in one direction and is reset to its first threshold level only when the input signal passes through the second threshold level in the opposite direction.

Accordingly, an object of this invention is to provide an improved threshold setting circuit.

Another object is to provide a bi-level threshold setting circuit in which the threshold levels are adjustable independently.

A further object is to provide a bi-level threshold setting circuit in which threshold levels are established by independent reference voltages, each established by a single voltage source.

These and other objects of the invention are achieved by providing a voltage comparator having two input terminals and an output terminal. A reference voltage of one polarity is coupled to one input terminal of the comparator for comparison with a signal coupled to the other input terminal. When the signal exceeds the reference voltage in the same sense or polarity, an output signal actuates a means for switching an independent reference voltage of the opposite polarity to the first input terminal. In that manner the comparator is not reset when the input signal falls below the first threshold level and continues to provide an output signal of a given amplitude until the input signal exceeds the second reference voltage in the opposite sense or polarity.

Other objects and advantages will become apparent from the following description in conjunction with the drawings in which—

Figure 1:
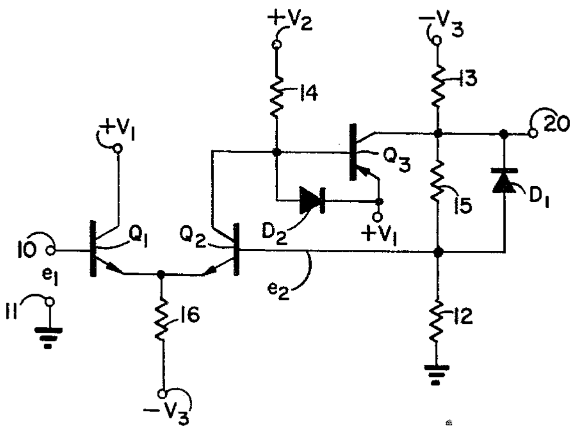
FIG. 1 is a circuit diagram of a first embodiment of the invention.

Referring now to a first embodiment of the invention illustrated in FIG. 1, a differential amplifier comprising NPN transistors $Q_1$ and $Q_2$ is provided for comparing input voltage $e_1$ across input terminals 10 and 11 with a reference voltage $e_2$ appearing across a resistor 12 connected between the base of transistor $Q_2$ and ground. A resistor 13 and a diode $D_1$ are connected in series between a voltage source $-V_3$ and the resistor 12 to provide a negative reference voltage at the base of the transistor $Q_2$. The diode $D_1$ is connected with its cathode to the resistor 13 and its anode connected to the resistor 12 so that the voltage dividing network providing a negative reference voltage at the base of the transistor $Q_2$ effectively consists of only the resistor 12 and the resistor 13.

If the input signal $e_1$ is 0 volts, and if the reference voltage $e_2$ is negative, then transistor $Q_1$ is conducting and the transistor $Q_2$ is cut off. A third transistor $Q_3$ is also cut off because it is of the PNP type and has its base connected to the collector of the transistor $Q_2$, which is connected by a resistor 14 to a voltage source of $+V_2$, and has its emitter connected to a less positive voltage source $+V_1$. A diode $D_2$ connected between the base and emitter electrodes of the transistor $Q_3$ protects the base-to-emitter junction by preventing the base electrode from being biased more positive with respect to the emitter or $+V_1$ than the voltage drop across it.

The circuit will remain in that state with only transistor $Q_1$ conducting until the input signal $e_1$ becomes more negative than the reference voltage $-e_2$, at which time the transistor $Q_1$ is turned off and the transistor $Q_2$ turned on owing to a common emitter resistor 16.

A negative output signal at the collector of the transistor $Q_2$ is inverted by the transistor $Q_3$ and fed back to the base of the transistor $Q_2$ through a resistor 15, making the reference voltage $e_2$ less negative. This feedback signal causes a regenerative action to ensue until the transistor $Q_1$ is cut off owing to a common emitter resistor 16 and the transistor $Q_3$ is driven to saturation.

When the circuit is in its second conductive state, the reference voltage $e_2$ at the base of the transistor $Q_2$ is determined by the following equation:

$$+e_2=\frac{(V_1-V_{ce})R_{12}}{R_{12}+R_{15}} \quad (1)$$

where $V_{ce}$ is the saturation voltage of the transistor $Q_3$; $R_{12}$ is the resistance of resistor 12; and $R_{15}$ is the resistance of resistor 15. If the voltage $+V_1$ applied to the emitter of the transistor $Q_3$ is chosen to be much larger than $V_{ce}$, the tolerance on the reference voltage $+e_2$ applied to the base of the transistor $Q_2$ is determined primarily by the tolerance on the voltage supply $+V_1$ and the tolerance on the voltage dividing network comprising the resistors 12 and 15.

It should be noted that when the transistor $Q_3$ is driven to saturation to couple a positive voltage $+V_1$ to the junction between the resistors 13 and 15, the diode $D_1$ is reverse-biased and the voltage at a terminal 20 is at $V_1 - V_{ce}$ which indicates that the circuit is in its second conductive state.

The circuit will remain in the second conductive state until the input signal $e_1$ becomes equal to or more positive than the reference voltage $+e_2$. When the input signal $e_1$ becomes more positive, a regenerative action ensues again to cause the circuit to go into its first conductive state in which the transistors $Q_2$ and $Q_3$ are cut off, and transistor $Q_1$ is conducting in the active region. The reference voltage $e_2$ is then returned to its negative voltage level determined by the following equation:

$$-e_2 = \frac{(-V_3 + V_{D1}) R_{12}}{R_{12} + R_{13}} \quad (2)$$

where $V_{D1}$ is the voltage drop across the diode $D_1$ and $R_{13}$ is the resistance of resistor 13. If the voltage $-V_3$ is chosen to be much large than $V_{D1}$, the tolerance on the reference voltage $-e_2$ is determined primarily by the tolerance on the voltage supply $-V_3$ and the tolerance on the voltage divider comprising resistors 12 and 13. The circuit remains in this first state until the input signal $e_1$ becomes equal to or more negative than the negative reference voltage $e_2$. Until then, the voltage at the output terminal remains at a negative level equal to $-(e_2 + V_{D1})$.

An exemplary circuit which operates in accordance with the foregoing description may be provided by using the following values for resistors and voltage supplies:

$V_1 = +10$ v.
$V_2 = +25$ v.
$V_3 = -10$ v.
Resistor 12=620 ohms
Resistor 13=8.8K ohms
Resistor 14=36K ohms
Resistor 15=9.1K ohms
Resistor 16=9.3K ohms With those values, the amplitude of both the positive and negative reference voltages provided in accordance with the foregoing equations is .62 volt.

The overall tolerance on the operation of the threshold setting circuit is affected by the tolerance achieved on the positive and negative reference voltages, and by the characteristics of the transistors and diodes employed. Any difference in the base-to-emitter voltages $V_{BE}$ of the transistors $Q_1$ and $Q_2$ will be added or subtracted from the threshold setting level. Another factor which affects overall tolerance is changes in the D.C. current gain of the transistor $Q_3$. All of the effects caused by the transistor characteristics may be eliminated by properly adjusting the resistors 13 and 15. The positive reference voltage may be adjusted by changing the value of the resistor 15. Similarly, the negative voltage reference may be adjusted by varying the value of the resistor 13. If it is desired to maintain the negative reference voltage equal in magnitude to the positive reference voltage, both may be adjusted in magnitude equally by varying only the value of the resistor 12. The reference voltages thus separately established and adjusted are further independent in that each depends upon a separate power supply, namely $+V_1$ for $e_2$ and $-V_3$ for $-e_2$.

Figure 2:
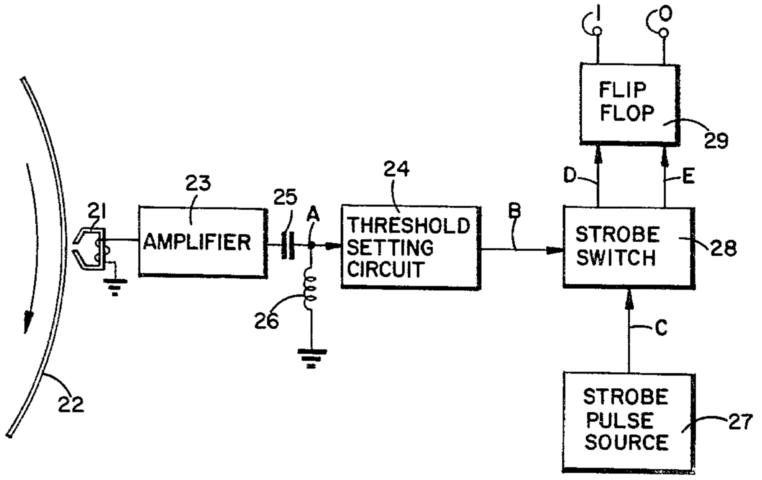
FIG. 2 is a schematic block diagram of a read channel in a magnetic drum or disc memory in which the present invention may be employed.

FIG. 2 discloses a playback or readout channel of an NRZ recorded memory system in which a pulse occurs only when there is a change in value of successively recorded binary digits. A read-head 21 senses the recorded digits, such as 10011 for the illustrated waveform of FIG. 3, as a track on a magnetic disc or drum 22 is rotated. An amplifier 23 couples the read-head 21 to the input of a threshold setting circuit 24. If it is required that the theshold setting circuit detect magnitudes of a signal having a quiescent level which is not ground, or which may vary from ground potential, A.C. coupling may be employed, such as a capacitor 25 and inductor 26 as shown.

The threshold setting circuit of FIG. 1 may be advantageously used as the threshold setting circuit 24 in the read channel of FIG. 2. In a typical application it accepts read signals which have been amplified to a peak value exceeding .75 volt, and rejects noise signals of a peak value not exceeding .50 volt if the reference voltages are ±.62 ±20% volts.

Figure 3:
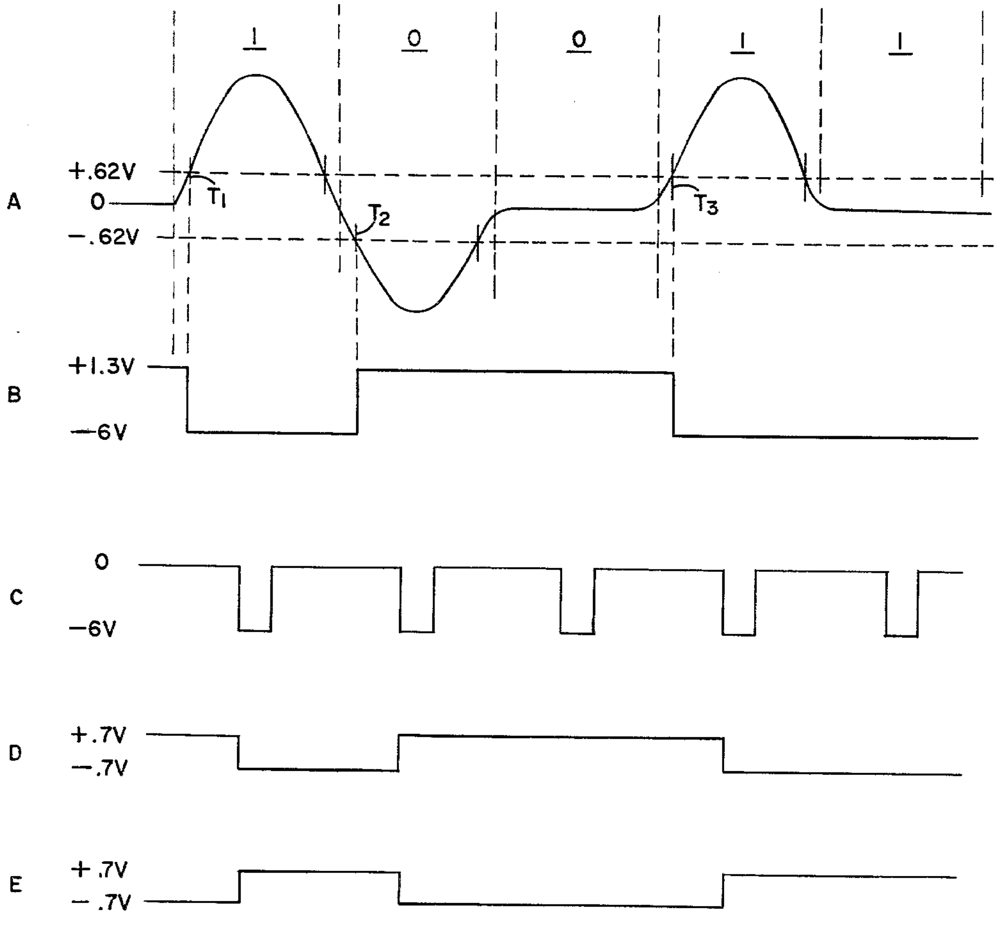
FIG. 3 is a timing diagram of wave forms appearing at indicated points of the block diagram in FIG. 2.

In operation, assuming the threshold circuit 24 to be initially set with a +.62 v. reference voltage, the output represented by the waveform B of FIG. 3 remains at a high level until the input waveform A exceeds the threshold level of +.62 v. at time $T_1$, whereupon the threshold circuit is reset as described hereinbefore with reference to FIG. 1 to provide a −.62 v. reference. Accordingly, the output waveform B remains at a lower level until the waveform A exceeds −.62 v. in the negative direction at time $T_2$, whereupon the threshold setting circuit is again set to provide a +.62 v. reference. In that manner, the voltage level of the waveform B is changed from the lower level to the upper level only when the recorded digits being sensed change from a binary 1 to a binary 0. The upper level of the waveform B then represents a binary 0 and the lower level represents a binary 1.

The next two digits to be sensed are 0 and 1. When the digit 0 is sensed, a pulse does not occur since it is the same as the preceding digit read; but when the digit 1 is sensed, a pulse occurs which exceeds the +.62 v. reference and resets the threshold setting circuit 24 to provide a lower level output signal and a −.62 v. reference. Since the last digit is a 1, a pulse does not occur during the last period and the waveform B remains at a lower level, indicating that a binary digit 1 is sensed during the last period.

A strobe pulse source 27 transmits a negative 0 to −6 v. pulse through a strobe switch 28 to set or reset a flip-flop 29 according to whether a binary digit 1 or binary digit 0 is being sensed during successive periods. The waveforms C, D and E of FIG. 3 indicate the signals present on the corresponding lines C, D and E of FIG. 2 to accomplish that.

Figure 4:
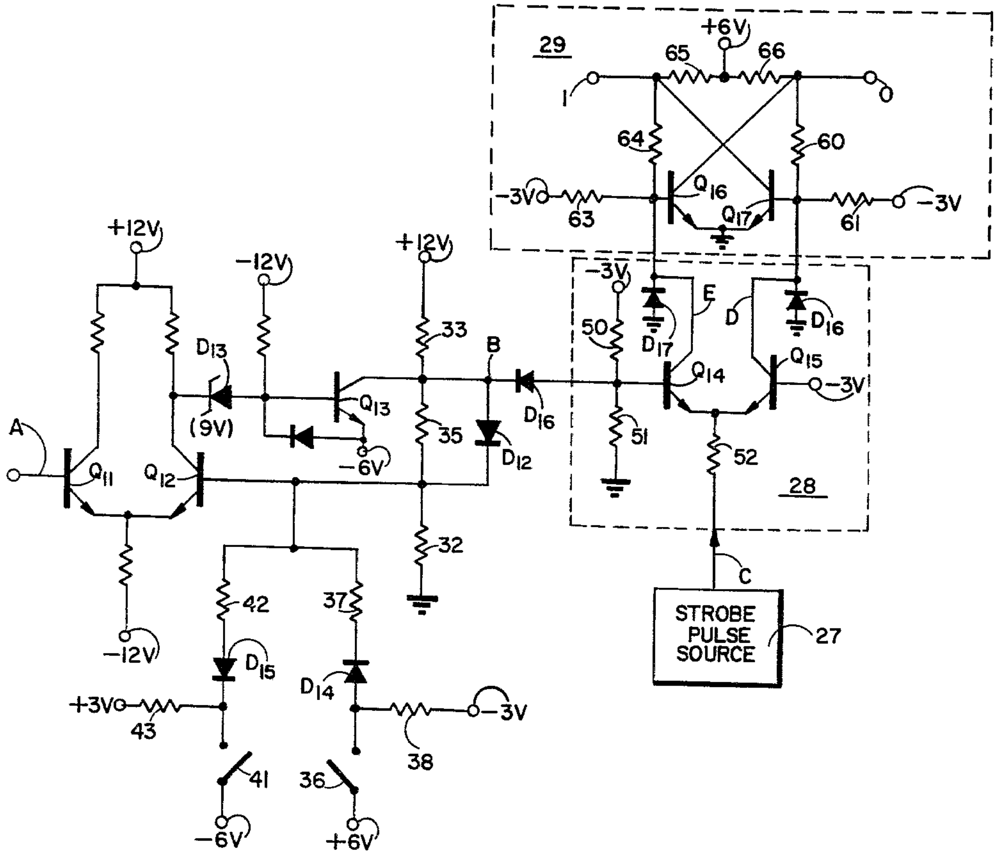
FIG. 4 is a schematic diagram of a second embodiment of the invention.

FIG. 4 is a circuit diagram of a second embodiment of the invention and a circuit diagram for the strobe switch 28. The threshold setting circuit comprises transistors $Q_{11}$, $Q_{12}$ and $Q_{13}$ which are arranged in a manner similar to the cicuit of FIG. 1. However, it should be noted that the transistor $Q_{13}$ is of the NPN type whereas the corresponding transistor $Q_3$ of FIG. 1 is of the PNP type. Accordingly, the operation of the threshold setting circuit in FIG. 4 differs in that while the transistor $Q_{12}$ is conducting the transistor $Q_{13}$ is cut off and while the transistor $Q_{12}$ is cut off the transistor $Q_{13}$ is conducting at saturation.

Assuming an initial reference voltage on the base of transistor $Q_{12}$ to be +.62 volt, the transistor $Q_{11}$ is cut off, the transistor $Q_{12}$ is conducting and the transistor $Q_{13}$ is cut off. The voltage reference of +.62 v. is then established by the voltage dividing network consisting of resistor 32, diode $D_{12}$ and resistor 33 connected in series between a source of +12 v. and ground. When the input signal at the base of the transistor $Q_{11}$ exceeds +.62 v., the transistor $Q_{11}$ is turned on and the transistor $Q_{12}$ is turned off. With the transistor $Q_{12}$ cut off, its collector electrode potential increases toward +12 v. A zener diode $D_3$ provides a drop of 9 volts to the base of the transistor $Q_{13}$ so that a +3 v. signal drives the transistor $Q_{13}$ into saturation.

With the transistor $Q_{13}$ conducting at saturation, its collector electrode drops from about 1.5 volts to about −5 volts whereupon the diode $D_{12}$ is reverse-biased and a reference voltage of −.62 v. is provided at the base of the transistor $Q_{12}$ by the voltage dividing network comprising resistors 32 and 35 connected in series.

To initially set the reference voltage at the base of the transistor $Q_{12}$ at +.62 v. for an operation similar to that described with reference to FIGS. 2 and 3, a switch 36 is momentarily closed to establish a reference voltage of +.62 v. by the voltage dividing action of a resistor 37 and diode $D_{14}$ in series with the resistor 32 between a source of +6 v. and ground. When the switch 36 is thereafter opened, a resistor 38 connected to a −3 v. source reverse-biases the diode $D_{14}$. If the threshold setting circuit is to be initially set with a reference voltage of −.62 v. at the base of the transistor $Q_{12}$, a switch 41 is momentarily closed instead to provide a reference voltage of −.62 v. by the voltage dividing action of a resistor 42 and diode $D_{15}$ in series with the resistor 32 between a source of −6 v. and ground. Thereafter, when the switch 41 is opened, a resistor 43 connected to a source of +3 v. reverse-biases the diode $D_{15}$.

The strobe switch 28 is coupled to the threshold setting circuit by a diode $D_{16}$ having its anode connected to the base of a transistor $Q_{14}$ which is biased by a resistor 50 connected to a source of −3 v. and a resistor 51 connected to ground. Accordingly, when the cathode of the diode $D_{16}$ is at the upper level of +1.3 v., the base of the transistor $Q_{14}$ is at a negative potential of approximately −1 v.; but when the cathode of the diode $D_{16}$ is at −6 v., the base of the transistor $Q_{14}$ is at −6 v. less the voltage drop across the diode $D_{16}$.

The strobe switch comprises the transistor $Q_{14}$ and a transistor $Q_{15}$ connected to a source of negative-going (0 to −6 v.) strobe pulses from the source 27 by a common emitter resistor 52. Thus the strobe switch is essentially a differential amplifier which transmits a current pulse to the flip-flop 29 over a line D or E upon the occurrence of a negative-going strobe pulse depending upon whether an upper level signal of about +1.3 v. is being transmitted to the diode $D_{16}$ or a lower level signal of about −6 v. If an upper level signal is being transmitted by the threshold setting circuit, the negative-going strobe pulse is effectively steered to the line E to reset the flip-flop 29, thereby indicating that a binary digit 0 has just been read. Similarly, if a lower level signal is being transmitted, the strobe pulse is effectively steered to the line D through the transistor $Q_{15}$ which has its base connected to a source of −3 v. to set the flip-flop 29, therebv indicating that a binary digit 1 has just been read.

Both of the lines D and E are clamped to ground by diodes $D_{16}$ and $D_{17}$ to prevent the input terminals of the flip-flop 29 from being driven below −.7 volt. However, it should be noted that the manner in which the collectors of the transistors $Q_{14}$ and $Q_{15}$ are to be connected to the flip-flop 29 depends upon the circuit configuration of the flip-flop itself. In this instance the flip-flop comprises two cross-coupled NPN transistors $Q_{16}$ and $Q_{17}$, each biased in a common-emitter configuration. The base electrodes of the transistors $Q_{16}$ and $Q_{17}$ are directly connected to the collector electrodes of the transistors $Q_{14}$ and $Q_{15}$ respectively. While a strobe pulse is being effectively steered to the line D, the transistor $Q_{14}$ is turned off and the transistor $Q_{15}$ is turned on, thereby setting the flip-flop with the transistor $Q_{17}$ off and the transistor $Q_{16}$ on. A voltage dividing network comprising resistors 60 and 61 connected between ground (through the conducting transistor $Q_{16}$) and the source of −3 v. holds the collector of the transistor $Q_{15}$ at −.7 v. while a voltage dividing network comprising resistors 63, 64 and 65 connected between the sources of −3 v. and +6 v. holds the collector of the transistor $Q_{14}$ at +.7 v. until a strobe pulse resets the flip-flop 29. Then the collector of the transistor $Q_{14}$ is held at −.7 v. by the voltage dividing resistors 63 and 64, while the collector of the transistor $Q_{15}$ is held at +.7 v. by a voltage dividing network comprising the resistors 60 and 61 in series with a resistor 66 in a similar manner as represented by the waveforms D and E of FIG. 3.

While the principles of the invention have now been made clear in an illustrative embodiment, there will be immediately obvious to those skilled in the art other low-level switching applications, and many modifications in structure, arrangement, proportions, the elements, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. A threshold setting circuit comprising
a voltage comparator having two input terminals and an output terminal,
means for applying a reference voltage of a preselected first level and polarity to one of said input terminals,
means for applying a voltage signal to the other of said input terminals for comparison with a reference voltage, and
means coupled to the output terminal of said comparator for switching said reference voltage to a preselected second level of opposite polarity from said first level when said comparator detects that said voltage signal exceeds said preselected first level in a given sense, and for returning said reference voltage to said preselected first level when said comparator detects that said voltage signal exceeds said preselected second level in an opposite sense.

2. A threshold setting circuit comprising
a voltage comparator having first and second input terminals and an output terminal,
means for applying a voltage signal to said first input terminal for comparison with a reference voltage,
means for applying a reference voltage of a preselected first level and polarity to said second input terminal,
means coupled to the output terminal of said comparator for switching said reference voltage to a preselected second level of opposite polarity from said first level when said comparator detects that said voltage signal becomes equal to or greater than said preselected first level, and
means coupled to said output terminal for returning said reference voltage to said preselected first level in response to said comparator detecting that said voltage signal is equal to said preselected second level.

3. A threshold setting circuit comprising
a voltage comparator having first and second input terminals and an output terminal,
means for coupling a voltage signal to said first input terminal for comparison with a reference voltage,
a first voltage dividing network for applying said reference voltage of a preselected first level polarity to said second input terminal,
a second voltage dividing network for applying said reference voltage of a preselected second level of opposite polarity from said first level to said second input terminal,
means coupled to said output terminal of said comparator for switching operation from said first voltage dividing network to said second voltage dividing network when said comparator detects said voltage signal becomes equal to or greater than said reference voltage, and
means coupled to said output terminal for restoring operation to said first voltage dividing network thereby to return said reference voltage to said preselected first level in response to said comparator detecting that said voltage signal is equal to said preselected second reference level.

4. A bipolar threshold setting circuit comprising
a voltage comparator having first and second input terminals and an output terminal,
means for applying a voltage signal to said input terminal for comparison with a reference voltage,
a voltage dividing network coupled at one end to a source of voltage of a first polarity and connected at the other end to ground for applying a reference voltage of a first level and polarity to said second input terminal, and means coupled to said output terminal for switching the one end of said voltage dividing network to a second source of voltage of a second polarity for applying a reference voltage of a second level and polarity the moment said comparator detects that the voltage signal is of the same polarity and equal to or greater than said voltage reference of a first level and polarity, and for switching the one end of said voltage dividing network back to said first voltage source when said comparator detects said voltage signal is of the same polarity and equal to or greater than said voltage reference of a second level and polarity.

5. A bipolar threshold setting circuit as defined by claim 4 wherein said voltage dividing network is coupled at one end to a source of voltage of a first polarity by a resistor, and said last mentioned means comprises a low impedance switch responsive to the output of said comparator.

6. A bipolar threshold setting circuit as defined by claim 5 wherein said voltage dividing network comprises a first resistor connected between the one end thereof and the second input terminal of said comparator, a second resistor connected between the second input terminal of said comparator and ground, and a unidirectional current conducting device connected in parallel with said first resistor and poled for forward current conduction through said second source of voltage.

7. A bipolar threshold setting circuit as defined by claim 6 wherein said comparator comprises first and second transistors, each having its emitter electrode connected to a source of bias potential of a given polarity through a common resistor and its collector electrode separately connected to a source of bias potential of opposite polarity, and the base electrodes of said first and second transistors are connected to the means for applying a voltage signal and to said voltage dividing network, respectively, and said switching means comprises a third transistor having its base electrode connected to the collector electrode of said second transistor, its emitter electrode connected to said second source of voltage, and its collector electrode connected to the one end of said voltage dividing network.

8. A bipolar threshold setting circuit as defined by claim 7 wherein said first and second transistors are of one conductivity type and said third transistor is of a complementary conductivity type.

9. A bipolar threshold setting circuit as defined by claim 7 wherein said first, second and third transistors are of the same conductivity type, and the base electrode of said third transistor is coupled to said source of bias potential of said given polarity by a resistor, and to the collector electrode of said second transistor by a zener diode poled for constant voltage drop between the collector of said second transitsor and the base of said third transistor.

10. A bipolar threshold setting circuit as defined by claim 7 including means for momentarily applying to the base of said second transistor a voltage equal to said first reference voltage to set said comparator at a predetermined state of conductivity in the absence of an input signal of the same polarity and equal to or greater than said first reference voltage.

11. In a magnetic memory system, a read channel comprising a voltage comparator having two input terminals and an output terminal, means for applying a reference voltage of a first level to one of said input terminals, means for applying a voltage signal to the other of said input terminal for comparison with a reference voltage, means coupled to the output terminal of said comparator for varying said reference voltage to a second level when said comparator detects that said voltage signal exceeds said first level in a given sense, and for returning said reference voltage to said first level when said comparator detects that said voltage signal exceeds said second level in an opposite sense, a strobe switch, means for translating an output signal from said comparator output terminal to said strobe switch, a flip-flop connected to said strobe switch, and a source of strobe pulses connected to said strobe switch for translation to said flip-flop to set or reset said flip-flop according to whether said reference voltage is at said first or second level.

12. In a magnetic memory system, a read channel comprising a voltage comparator having first and second input terminals and an output terminal, means for applying a voltage signal to said first input terminal for comparison with a reference voltage, means for applying a reference voltage of a first level to said second input terminal, means coupled to the output terminal of said comparator for varying said reference voltage to a second level when said comparator detects that said voltage signal becomes equal to or greater than said first level, means coupled to said output terminal for returning said reference voltage to said first level the moment said comparator detects that said voltage signal is equal to said second level, a strobe switch, means for translating an output signal from said comparator output terminal to said strobe switch, a flip-flop connected to said strobe switch, and a source of strobe pulses connected to said strobe switch for translation to said flip-flop to set or reset said flip-flop according to whether said reference voltage is at said first or second level.

13. In a magnetic memory system, a read channel comprising a voltage comparator having first and second input terminals and an output terminal, means for coupling a voltage signal to said first input terminal for comparison with a reference voltage, a voltage dividing network for applying said reference voltage of a first level to said second input terminal, means coupled to the output terminal of said comparator for altering said voltage dividing network to change said reference voltage to a second level when said comparator detects said voltage signal becomes equal to or greater than said reference voltage, means coupled to said output terminal for restoring said voltage dividing network thereby to return said reference voltage to said first level the moment said comparator detects that said voltage signal is equal to said second reference, a strobe switch, means for translating an output signal from said comparator output terminal to said strobe switch, a flip-flop connected to said strobe switch, and a source of strobe pulses connected to said strobe switch for translation to said flip-flop to set or reset said flip-flop according to whether said reference voltage is at said first or second level.

14. In a magnetic memory system, a read channel comprising a voltage comparator having first and second input terminals and an output terminal, means for applying a voltage signal to said input terminal for comparison with a reference voltage, a voltage dividing network coupled at one end to a source of voltage of a first polarity and connected at the other end to ground for applying a reference voltage of a first level and polarity to said second input terminal, means coupled to said output terminal for switching the one end of said voltage dividing network to a second source of voltage of a second polarity for applying a reference voltage of a second level and polarity the moment said comparator detects that the voltage signal is of the same polarity and equal to or greater than said voltage reference of a first level and polarity, and for switching the one end of said voltage dividing network back to the said first voltage source when said comparator detects said voltage signal is of the same polarity and equal to or greater than said voltage reference of a second level and polarity, a strobe switch, means for translating an output signal from said comparator output terminal to said strobe switch, a flip-flop connected to said strobe switch, and a source or strobe pulses connected to said strobe switch for translation to said flip-flop to set or reset said flip-flop according to whether said reference voltage is at said first or second level and polarity.

References Cited by the Examiner

UNITED STATES PATENTS

| | | | |
|---|---|---|---|
| 2,827,574 | 3/1958 | Schneider | 307—88.5 |
| 2,852,625 | 9/1958 | Nuut | 330—26 X |
| 2,896,192 | 7/1959 | Husman | 330—69 X |
| 3,012,153 | 12/1961 | Mussard | 307—88.5 |
| 3,018,386 | 1/1962 | Chase | 307—88.5 |
| 3,176,148 | 3/1965 | Lampke | 307—88.5 |
| 3,194,985 | 7/1965 | Smith et al. | 307—88.5 |

ARTHUR GAUSS, *Primary Examiner.*

M. LEE, J. JORDAN, *Assistant Examiners.*